United States Patent [19]

Ibaragi et al.

[11] 4,183,877

[45] Jan. 15, 1980

[54] HIGH-IMPACT POLYSTYRENE COMPOSITION AND PRODUCTION THEREOF

[75] Inventors: Toshio Ibaragi, Kawasaki; Kunio Satake, Yokohama; Tsuyoshi Yamada, Yokosuka; Kiyoshi Hayakawa, Yokohama, all of Japan

[73] Assignee: Asahi Kasei Kogyo Kabushiki Kaisha, Osaka, Japan

[21] Appl. No.: 892,848

[22] Filed: Apr. 3, 1978

Related U.S. Application Data

[63] Continuation of Ser. No. 685,149, May 11, 1976, abandoned.

[30] Foreign Application Priority Data

May 12, 1975 [JP] Japan .................................. 50-54656

[51] Int. Cl.$^2$ ............................................ C08F 279/02
[52] U.S. Cl. ........................................ 525/70; 525/195
[58] Field of Search ....................... 260/880 R, 880 B; 526/335

[56] References Cited

U.S. PATENT DOCUMENTS

| 3,317,918 | 5/1967 | Foster | 526/335 |
| 3,526,606 | 9/1970 | Minekawa | 260/880 B |
| 3,868,434 | 2/1975 | Westphal | 260/880 R |
| 3,937,681 | 2/1976 | Nordsiek | 260/33.6 AQ |
| 3,957,915 | 5/1976 | Spanswick | 260/880 R |
| 3,989,771 | 11/1976 | Reith | 260/880 R |

*Primary Examiner*—Paul R. Michl
*Attorney, Agent, or Firm*—Armstrong, Nikaido, Marmelstein & Kubovcik

[57] ABSTRACT

High-impact polystyrene composition is produced by radical polymerization, e.g. bulk or bulk-suspension polymerization, of styrene having dissolved therein 2 to 20% by weight of one or more polybutadienes prepared by solution polymerization using an organic lithium compound as catalyst, said polybutadienes having (1) 1,2-vinyl content of more than 15 to 35% and cis-1,4 content of 20 to 85%, and (2) Mooney viscosity of 25 to 85, 5% styrene solution viscosity at 25° C. being 50 to 200 cps and between 1.5 and 3.0 of the Mooney viscosity.

15 Claims, No Drawings

HIGH-IMPACT POLYSTYRENE COMPOSITION AND PRODUCTION THEREOF

This is a continuation, of application Ser. No. 685,149, filed May 11, 1976 now abandoned.

This invention relates to a process for producing useful high-impact polystyrene and to a composition thereof.

Heretofore, various methods have been proposed to improve brittleness of polystyrene. For example, there have been proposed methods for producing impact-resistant polystyrene by bulk polymerization (U.S. Pat. No. 2,694,692) or bulk-suspension polymerization (U.S. Pat. No. 2,862,906) of a styrene solution containing unvulcanized rubber as a toughening agent, or mechanical blend of polystyrene with unvulcanized rubber. The unvulcanized rubber used as a toughening agent includes polybutadiene rubber, butadiene-styrene copolymer rubber (SBR), and the like, the polybutadiene rubber generally being more excellent in impact strength at low temperatures than SBR. As the polybutadiene rubber, so-called low-cis polybutadienes containing 25 to 45% of cis-1,4 obtained by solution polymerization using organo-lithium catalysts with less than 15% of 1,2-vinyl content (British Patent No. 998,772) or so-called high-cis polybutadienes containing over 90% of cis-1,4 obtained by polymerization using Ziegler-type catalysts have widely been used. But since the high-cis polybutadienes contain more impurities, e.g. gel, than the low-cis polybutadienes, commercial value of the resulting impact-resistant polystyrene decreases because of its poor appearance, e.g. fish-eyes. Therefore the high-cis polybutadienes are not so preferable industrially as the low-cis polybutadienes as a toughening agent. The bulk or bulk-suspension polymerized polystyrene using the low-cis polybutadienes mentioned above as a toughening agent is excellent in impact strength and appearance, but there are the following defects in the industrial production thereof; in order to maintain higher mechanical properties of the resulting impact-resistant polystyrene, it has been necessary to use the low-cis polybutadiene having higher molecular weight so far as conventional low-cis polybutadienes are used and in that case viscosity of the solution obtained by dissolving the polybutadiene in styrene becomes too high, which is disadvantageous to stirring in industrial production and to transportation, and further to productivity. Particularly when a large amount of the toughening agent is used, these defects become serious. If butadiene-styrene copolymer rubber is used as a toughening agent in order to remove the above-mentioned defects of polybutadiene rubber, impact strength at low temperatures of the resulting polystyrene is not so good even though the solution viscosity lowers.

Recently, with the spread of electric appliances in cold districts and the spread of frozen desserts and frozen foods, impact strength at low temperatures of various shaped articles made from impact-resistant polystyrene becomes more and more important, particularly when the articles are used at such a low temperature as −40° C. or lower.

It is generally admitted that factors giving toughness to polystyrene depend on the rubber phase dispersed as particles among the polystyrene phase, that is, the lower the glass-transition temperature (Tg) of the rubber becomes, the higher the impact strength at low temperatures of polystyrene becomes. Further it is known that Tg of polybutadiene becomes lower when the cis-1,4 content becomes higher and the 1,2-vinyl content becomes lower. Thus the use of polybutadiene rich in cis-1,4 content and poor in 1,2-vinyl content as a toughening agent to increase impact strength of polystyrene at low temperatures is proposed (e.g. Japanese Patent Kokai 46691/73). The present inventors found that evaluation of impact strength at −40° C. or lower was insufficient when only conventional Izod impact strength was employed and that falling weight impact strength at low temperatures was able to approximately represent practical strength particularly in the case of injection molded articles. Further the present inventors found that falling weight impact strength at low temperatures had a close relationship to 1,2-vinyl content in the polybutadiene used and accomplished the present invention based on the finding that a special range of 1,2-vinyl content in the polybutadiene was effective. This is quite contrary to conventional idea and knowledge that the very low content of 1,2-vinyl is preferable. This is very surprising finding.

It is an object of the present invention to provide a process for producing high-impact polystyrene excellent in impact strength at low temperatures, particularly in practical impact strength at low temperatures of injection molded articles, with excellent productivity.

The present invention provides a process for producing high-impact polystyrene which comprises dissolving 2 to 20 parts by weight of one or more polybutadienes prepared by solution polymerization using an organic lithium compound as catalyst, said polybutadienes having (1) 1,2-vinyl content of more than 15 to 35% and cis-1,4 content of 20 to 85%, and (2) Mooney viscosity ($ML_{1+4}$) of 25 to 85, solution viscosity of styrene containing 5% by weight of the polybutadienes (SV) at 25° C. being 50 to 200 cps, and $1.5\ ML_{1+4} \leq SV \leq 3.0\ ML_{1+4}$, in 80 to 98 parts by weight of styrene, the total weight of the polybutadienes and styrene being 100 parts by weight, and carrying out radical polymerization of the resulting solution.

The high-impact polystyrene obtained by the process of the present invention is characterized by excellent practical impact strength at low temperatures comparing with not only that obtained by using random copolymerized type styrene-butadiene rubber prepared by solution polymerization but also that obtained by using a high-cis polybutadiene prepared using a Ziegler-type catalyst. This is the most predominant feature of the present invention, which can only be attained by using the special polybutadiene prepared by solution polymerization using an organic lithium compound as catalyst and having 15 to 35% of 1,2-vinyl and special Mooney and solution viscosities. This is an epoch-making feature and contrary to conventional knowledge that lower content of 1,2-vinyl in polybutadiene makes Tg of the rubber lower, which results in increasing impact strength of polystyrene at low temperatures. Further since the special polybutadiene used in the present invention shows low solution viscosity when dissolved in styrene comparing with a conventional polybutadiene prepared by using a lithium compound catalyst, it is very advantageous industrially, e.g. in stirring and transportation.

The special polybutadiene used in the present invention as a toughening agent should satisfy the conditions mentioned below.

First, the special polybutadiene must have the 1,2-vinyl content of more than 15 to 35%, preferably 16 to 35%, more preferably 17 to 30% and the cis-1,4 content of 20 to 85%, preferably 25 to 45%, more preferably 30 to 40%. If the microstructure of polybutadiene is outside the above-mentioned ranges, the resulting polystyrene is lowered in falling weight impact strength at low temperatures and in practical value. Distribution of the 1,2-vinyl bonds may take any form, for example, uniform distribution in the molecular chains or gradually decreasing distribution along the molecular chains, distribution as blocks or at random, or the like. In any case, the 1,2-vinyl content must be more than 15 to 35%.

Second, the special polybutadiene must have Mooney viscosity ($ML_{1+4}$) of 25 to 85, preferably 30 to 70, more preferably 30 to 65, solution viscosity of styrene containing 5% by weight of the polybutadiene (SV) at 25° C. being 50 to 200 cps, preferably 50 to 150 cps, more preferably 50 to 135 cps, and $1.5\ ML_{1+4} \leq SV \leq 3.0\ ML_{1+4}$, preferably $1.5\ ML_{1+4} \leq SV \leq 2.5\ ML_{1+4}$, more preferably $1.6\ ML_{1+4} \leq SV \leq 2.2\ ML_{1+4}$. If the polybutadiene has Mooney viscosity of less than 25 or SV of less than 50 cps, the resulting polystyrene is lowered in impact strength and tensile strength. If the polybutadiene has Mooney viscosity of more than 85 or SV of more than 200 cps, there are various disadvantages in that it takes longer time to dissolve the rubber in styrene, the stirring and transportation are difficult, and thus the productivity is lowered. If SV is more than $3.0\ ML_{1+4}$, the solution viscosity increases and the productivity is lowered in order to obtain the high-impact polystyrene having the same physical properties. Further if SV is less than $1.5\ ML_{1+4}$, the resulting polystyrene is much lowered in impact strength, since radii of the rubber particles among the polystyrene become too small.

The special polybutadiene used as a toughening agent in the present invention is prepared by solution polymerization using an organic lithium compound as catalyst.

The organic lithium compound is preferably a hydrocarbon bonded with at least one lithium atom in the molecule. Examples of the organic lithium compounds are methyllithium, isopropyllithium, n-butyllithium, t-butyllithium, sec-butyllithium, t-octyllithium, n-decyllithium, phenyllithium, naphthyllithium, 4-butylphenyllithium, p-tolyllithium, 4-phenylbutyllithium, cyclohexyllithium, 4-butyl-cyclohexyllithium, 4-cyclohexyl-butyllithium, dilithiomethane, 1,4-dilithiobutane, 1,10-dilithiodecane, 1,20-dilithio-eicosane, 1,4-dilithio-cyclohexane, 1,4-dilithio-2-butene, 1,8-dilithio-3-decene, 1,4-dilithio-benzene, 1,2-dilithio-1,2-diphenylethane, 1,2-dilithio-1,8-diphenyl-octane, 1,3,5-trilithiopentane, 1,3,15-trilithio-eicosane, 1,3,5-trilithiocyclohexane, 1,3,5,18-tetralithio-decane, 1,5,10,20-tetralithio-eicosane, 1,2,4,6-tetralithio-cyclohexane, 4,4'-dilithio-biphenyl, and the like. Among them, n-butyllithium and sec-butyllithium are preferable.

In order to obtain the desired 1,2-vinyl content, a vinylating agent may be added to the polymerization system. As the vinylating agents, polar compounds such as ethers, for example, dimethyl ether, diethyl ether, tetrahydrofuran, ethyl methyl eher, ethyl propyl ether, di-n-propyl ether, di-n-octyl ether, dibenzyl ether, diphenyl ether, anisole, 1,2-dimethoxyethane, dioxane, paraldehyde; thioethers, for example, dimethyl sulfide, diethyl sulfide, di-n-propyl sulfide, di-n-butyl sulfide, methylethyl sulfide; amines, for example, dimethylethylamine, tri-n-propylamine, tri-n-butylamine, trimethylamine, triethylamine, N,N-dimethylaniline, pyridine, quinoline, N-ethyl-piperidine, N-methyl-N-ethylaniline, N-methyl-morpholine as disclosed in Japanese Patent Publication 15386/61 and J. Polymer Sci. 17, 299 (1960); and hexamethyl phosphoramide as disclosed in Japanese Patent Publication 5904/68 may be used. These polar compounds may be used in the range of 0.005 to 50% by weight, preferably 0.05 to 5% by weight based on the weight of polymerization solution.

In order to obtain the desired Mooney and solution viscosities, special attention should be paid to the solution polymerization of butadiene using an organic lithium compound as catalyst. Polybutadienes available in the market generally have SV more than $3.0\ ML_{1+4}$. Adjustment of Mooney viscosity and solution viscosity may be attained by increasing or decreasing the amount of catalyst used. Preferable methods to adjust SV between $1.5\ ML_{1+4}$ and $3.0\ ML_{1+4}$ are to add a small amount of divinylbenzene to the polymerization system (Japanese Patent Publication 17074/64), to bring about coupling reaction by treating the living polymer with a polyfunctional coupling agent such as halides, e.g. stannic chloride, carbon tetrachloride, chloroform, silicon tetrachloride, methyltrichlorosilane, etc., diesters, e.g. glycerol tristearate, glycerol trioleate, etc. (J. Polymer Sci. part A, 3, 93–103 (1965)), and the like. The amount of the polyfunctional coupling agent to be used may be 0.1 to 1.5 equivalent to the amount of lithium in the polymerization system. Other conventional methods may also be used if the viscosities are adjusted to the desired values.

Solution polymerization of butadiene may generally be carried out at a temperature in the range of $-80°$ to $+200°$ C., preferably 0° to 170° C. Any polymerization pressure may be used if the monomer is substantially maintained in the liquid state. Either a batch method or a continuous method may be used. Polymerization time is usually from 1 second to 24 hours.

The polybutadiene having the limitations as mentioned above in an amount of 2 to 20 parts by weight, preferably 3 to 15 parts by weight, is dissolved in 80 to 98 parts by weight, preferably 85 to 97 parts by weight of styrene, the total amount of the polybutadiene and styrene being 100 parts by weight. If the amount of polybutadiene is below 2 parts by weight, substantial increase in impact strength of the resulting polystyrene cannot be expected. If the amount of polybutadiene is more than 20 parts by weight, the solution viscosity increases, the productivity lowers, and the resulting polystyrene lowers in tensile strength, hardness and moldability remarkably. The polybutadiene may be used alone or as a mixture of two or more polybutadienes as limited above. A small amount of other rubbers such as styrene-butadiene rubber obtained by solution polymerization or emulsion polymerization may be used together with the polybutadiene so far as they do not influence the properties of the polybutadiene.

Butadiene which forms the special polybutadiene is 1,3-butadiene. A part of 1,3-butadiene may be replaced by one or more conjugate diolefins such as isoprene, 1,3-pentadiene, 2,3-dimethyl-1,3-butadiene, 2-ethyl-1,3-butadiene, 2,3-diethyl-1,3-butadiene, 2-phenyl-1,3-butadiene, 2,3-diphenyl-1,3-butadiene, and the like. The conjugate diolefins may be used in an amount of less than 50% by weight of the total weight of the resulting polybutadiene. Among the conjugate diolefins, isoprene and 1,3-pentadiene are preferable.

The styrene dissolving the special polybutadiene is polymerized by radical polymerization. As the radical polymerization, bulk polymerization and bulk-suspension polymerization are preferably used in industrial production.

In the bulk polymerization, polymerization of the styrene dissolving the special polybutadiene is carried out with heating at a temperature of 95° to 200° C., preferably 100° to 180° C., in the absence of a catalyst, or at a temperature of 20° to 150° C., preferably 50° to 150° C., in the presence of a catalyst or in the case of irradiation polymerization, until the polymerization of styrene is substantially completed, for example, the conversion of styrene being more than 80%.

As polymerization initiators, conventional ones such as benzoyl peroxide, cyclohexanone peroxide, lauroyl peroxide, t-butyl peroxide, t-butylperoxy benzoate, t-butylhydroperoxide, diacetyl peroxide, diethylperoxy carbonate, cumene hydroperoxide, cumyl peroxide, and the like, may be used alone or as a mixture thereof. The polymerization initiators may be used in the range of 0.05 to 0.5% by weight based on the weight of the polymerization solution. In the irradiation polymerization, conventional irradiating methods may be used. If required, conventional self-lubricating agents such as liquid paraffin may be added to the polymerization system in an amount of 1 to 5 parts by weight based on 100 parts by weight of the polymer. During the bulk polymerization, adjustment of stirring is important. After the conversion of styrene to the polymer becomes 30% or more, it is preferable to stop the stirring or to continue the stirring with very low speed. Excessive stirring sometimes lowers strengths of the resulting polymer. It is also preferable to carry out the bulk polymerization in the presence of a small amount of a diluent such as toluene, ethylbenzene, benzene, isopropylbenzene, diphenylmethane, cyclohexane, and the like. The diluent may be removed with heating together with the unreacted styrene after the polymerization. A small amount of t-dodecyl mercaptan, alpha-methyl styrene dimer and the like may be used for regulating molecular weight. If a small amount of the unreacted styrene is present in the produced polymer after the polymerization, it is preferable to remove the unreacted styrene using a conventional method, e.g. removing under reduced pressure, removing using an extrusion equipment which is made in order to remove volatile matters, and the like.

The bulk-suspension polymerization used in the process of the present invention means polymerization the first half of which is carried out in bulk and the latter half of which is carried out in the suspended state. Namely, the styrene dissolving the special polybutadiene is polymerized in bulk, as mentioned above, with heating at a temperature of 50° to 120° C., preferably 70° to 100° C. in the presence of a catalyst or at a temperature of 90° to 200° C., preferably 100° to 150° C. in the absence of a catalyst, or with irradiation, until 50% or less, more preferably 10 to 40% of the styrene is polymerized partially. Then the partially polymerized mixture is dispersed in an aqueous medium in the presence of a suspension stabilizer with or without a surface active agent with stirring and the latter half of the reaction is accomplished by suspension polymerization at a temperature of 80° to 180° C., preferably 80° to 160° C. in the presence of a catalyst or at a temperature of 90° to 200° C., preferably 100° to 180° C. in the absence of a catalyst. As the suspension stabilizers, conventional ones such as hydroxymethyl cellulose, polyvinyl alcohol, and the like may be used. As the surface active agents, conventional ones such as sodium dodecylbenzenesulfonate, sodium stearate, and the like may be used.

The resulting polymer in the case of the bulk-suspension polymerization as well as the bulk polymerization is washed and dried, if required, pelletized or powdered, and put to practical use.

Other conventional methods modifying and improving the above-mentioned methods may also be employed to produce useful high-impact polystyrene.

In the above-mentioned methods, styrene may partially be replaced by other monomers radical copolymerizable with styrene. But the amount of comonomer cannot exceed 50% by weight of the total weight of the monomers including styrene. Examples of the comonomer include monovinylidene aromatic hydrocarbons; alpha-alkyl styrene monoaromatic compounds such as alpha-methyl styrene, alpha-ethyl styrene, alpha-methyl vinyl toluene, alpha-dialkyl styrenes, and the like; ring-substituted alkyl styrenes such as vinyltoluene, o-ethyl styrene, p-ethyl styrene, 2,4-dimethyl styrene, and the like; ring-substituted halostyrenes such as o-chlorostyrene, p-chlorostyrene, o-bromostyrene, 2,4-dichlorostyrene, and the like; ring-alkyl-, ring-halo-substituted styrenes such as 2-chloro-4-methyl styrene, 2,6-dichloro-4-methyl styrene, and the like; vinylnaphthalene; vinylanthracene; unsaturated nitriles such as acrylonitrile, methacrylonitrile, ethacrylonitrile, and the like; alpha or beta-unsaturated monobasic acids and derivatives thereof such as acrylic acid, methyl acrylate, ethyl acrylate, butyl acrylate, 2-ethylhexyl acrylate, methacrylic acid, methyl methacrylate, ethyl methacrylate, butyl methacrylate, 2-ethylhexyl methacrylate, acrylamide, methacrylamide, maleates, e.g. dimethyl maleate, diethyl maleate, dibutyl maleate, fumarates, e.g. dimethyl fumarate, diethyl fumarate, dibutyl fumarate, and the like. In the above-mentioned comonomers, the alkyl group as a substituent usually contains 1 to 4 carbon atoms including isopropyl and isobutyl. The comonomers may be used alone or as a mixture of two or more comonomers. Among the comonomers, alphamethyl styrene, vinyltoluene, acrylonitrile and methyl methacrylate are preferable.

The thus obtained high-impact polystyrene is a composition forming a two-phase structure wherein a minor amount of the rubber particles, i.e. the polybutadiene particles or the particles of copolymer of butadiene partly substituted for one or more comonomers, dispersing among a major amount of polystyrene. (The rubber particles usually occlude polystyrene.) A part of or all of the rubber particles are grafted onto the polystyrene during the polymerization of styrene and further form considerably hard particles by crosslinking. Weight ratio of the rubber to the polystyrene in the resulting high-impact polystyrene composition is from 2:98 to 20:80, preferably from 3:97 to 15:85.

The high-impact polystyrene thus obtained is remarkably excellent in practical impact strength at low temperatures comparing with conventional impact-resistant polystyrene including styrene alone or as a main component, and has the same or more excellent tensile strength, elongation and other physical properties comparing with the conventional one. Further, according to the present invention the productivity of the high-impact polystyrene is so excellent that the present invention is very significant in industrial production.

The high-impact polystyrene obtained by the process of the present invention may be used for producing various articles for practical use using various molding and shaping methods such as injection molding, extrusion molding, and the like, and particularly preferably used for producing injection molded articles to be employed at low temperatures.

In the processing, if required, additives such as oxidation inhibitors, ultraviolet absorbers, lubricants, releasing agents, fillers, and the like, and other thermoplastic resins such as general purpose polystyrene, methacrylic resins, and the like may be added to the high-impact polystyrene.

The present invention is illustrated more particularly by way of the following examples but, as will be more apparent, is not limited to the details thereof. In these examples, all parts and percent are given as parts or percent by weight unless otherwise specified.

EXAMPLE 1, Comparative Examples 1 and 2

Polybutadiene (Sample A) within the range of the present invention was prepared as follows.

In a jacketed autoclave having an inner volume of 10 l equipped with a stirrer, said autoclave having been washed and dried, and the atmosphere having been replaced with nitrogen, 1 kg of butadiene previously purified and dried and 4 kg of n-hexane were placed, and a n-hexane solution containing 15% of n-butyllithium in an amount of 0.85 g in terms of n-butyllithium and 2 moles of tetrahydrofuran per mole of n-butyllithium as a vinylating agent were added thereto. The polymerization was carried out at 70° C. for 3 hours maintaining the temperature at that level during the polymerization. To the resulting polymer, 0.2 mole of carbon tetrachloride per mole of n-butyllithium was added as a coupling agent and reacted for 30 minutes. To the resulting polymer solution, 12 g of di-t-butyl-4-methylphenol was added as a stabilizer and the solvent was removed by distillation with heating to give Sample A.

Physical properties of Sample A were as set forth in Table 1.

Mooney viscosity ($ML_{1+4}$) was measured as follows: using a large rotor which was preheated at 100° C. for 1 minute, and after rotating the rotor for 4 minutes, values of the Mooney viscometer were read off.

Solution viscosity of styrene containing 5% by weight of a rubber, e.g. polybutadiene, (SV) was measured using a Cannon-Fenske viscometer as 25° C.

Microstructure was determined using an infrared spectrophotometer and calculating by the Morello method.

For comparison, physical properties of a high-cis polybutadiene available commercially and conventionally used as a toughening agent (Nipol 1220 manufactured by Nippon Zeon Co., Ltd.) (Sample B) and a styrene-butadiene rubber prepared by emulsion polymerization (Nipol 1006 manufactured by Nippon Zeon Co., Ltd.) (Sample C) were measured and the results were as set forth in Table 1.

Using these rubbers, impact-resistant polystyrenes were prepared by bulk polymerization as follows.

A mixture of 5 parts of a rubber (Samples A–C as set forth in Table 1), 95 parts of styrene, 8 parts of toluene and 0.5 part of 2,6-di-t-butyl-4-methylphenol was stirred at room temperature for more than 12 hours to dissolve the toughening agent. The resulting solution was charged in a reactor wherein the polymerization was carried out by raising the temperature from 100° C. to 130° C. in 5 hours with stirring, then raising the temperature from 130° C. to 150° C. in 7 hours with stirring, and lastly raising the temperature from 150° C. to 180° C. in 3 hours. Then the temperature was raised to 230° C. and the unreacted matters were removed in vacuo. The resulting polymer was crushed and pelletized using an extruder. Then the polymer obtained was compression molded to measure Izod impact strength, tensile strength and elongation according to JIS K6871. On the other hand, the polymer obtained was injection molded using a mold having one side pin gate and the shape of 150 mm × 150 mm with 2 mm thick to form specimens for measuring falling weight impact strength.

The results obtained were as set forth in Table 1.

Table 1

| Example No. | Example 1 | Comparative Example 1 | Comparative Example 2 |
|---|---|---|---|
| Kind of rubber | Polybutadiene | Polybutadiene | Emulsion polymerized SBR |
| Sample No. | A | B | C |
| Mooney viscosity ($ML_{1+4}$) | 44 | 43 | 45 |
| 5% Styrene solution viscosity (SV) (cps) | 87 | 91 | 62 |
| | SV = 1.98 $ML_{1+4}$ | SV = 2.11 $ML_{1+4}$ | SV = 1.38 $ML_{1+4}$ |
| Microstructure | | | |
| 1,2-vinyl (%) | 18.3 | 1.1 | 25.5 |
| cis-1,4 (%) | 34.0 | 98.0 | 18 |
| Izod impact strength (notched) (kg · cm/cm) 23° C. | 7.2 | 7.3 | 7.0 |
| Tensile strength (kg/cm$^2$) | 220 | 185 | 230 |
| Elongation (%) | 40 | 50 | 30 |
| Falling weight impact strength (kg · cm) 23° C. | 15.8 | 5.1 | 12.0 |

Table 1-continued

| Example No. | Example 1 | Comparative Example 1 | Comparative Example 2 |
|---|---|---|---|
| −40° C. | 13.8 | 4.3 | 4.0 |

(Note)
Falling weight impact strength was measured under the following conditions:
Test specimen: a flat plate (150 × 150 × 2 mm)
Height of falling weight: about 15 cm
Curvature of the apex of faling weight: about 20 mm
Weight increment being used: 50 g
Impact strength: impact value at 50% breakage As is clear from Table 1, there are almost no differences among Example 1 and Comparative Examples 1 and 2 in Izod impact strength but Example 1 is by far superior to Comparative Examples 1 and 2 in falling weight impact strength particularly at the low temperature. Swelling index of Example 1 was 10 to 11, whereas those of Comparative Examples 1 and 2 were 16 and 11.5, respectively. Swelling index shows degree of swelling of the insoluble part of an impact-resistant polystyrene after dissolving it in toluene.

EXAMPLES 2 AND 3, Comparative Examples 3 and 4

Polybutadienes having different 1,2-vinyl contents were prepared as follows.

Using the same procedure as described in Example 1 for preparing Sample A except for using silicon tetrachloride in place of carbon tetrachloride as a coupling agent, polybutadiene (Sample D) having Mooney viscosity 37, 5% styrene solution viscosity 78 cps and 1,2-vinyl content 17.5% was obtained. In the same manner as described above but using 0.2 mole of hexamethyl phosphoramide per mole of n-butyllithium in place of tetrahydrofuran, polybutadiene (Sample E) having Mooney viscosity 39, 5% styrene solution viscosity 85 cps and 1,2-vinyl content 29% was obtained.

For comparison, polybutadiene (Sample F) was prepared by solution polymerization in hexane using n-butyllithium as a catalyst at 7° C. for 5 days. Sample F had Mooney viscosity 31, 5% styrene solution viscosity 128 cps and 1,2-vinyl content 7.3%. In the same manner as Sample F but further using 0.5 mole of hexamethyl phosphoramide per mole of n-butyllithium, polybutadiene (Sample G) having Mooney viscosity 45, 5% styrene solution viscosity 91 cps and 1,2-vinyl content 39% was obtained.

Using these polybutadienes (Samples D–G), impact-resistant polystyrenes were prepared by bulk polymerization in the same manner as described in Example 1. Strengths of the polystyrenes were evaluated in the same manner as described in Example 1 and the results were as set forth in Table 2.

Table 2

| Example No. | Example 2 | Example 3 | Comparative Example 3 | Comparative Example 4 |
|---|---|---|---|---|
| Polybutadiene Sample No. | D | E | F | G |
| Mooney viscosity (ML$_{1+4}$) | 37 | 39 | 31 | 45 |
| 5% Styrene solution viscosity (SV) (cps) | 78 | 85 | 128 | 91 |
|  | SV = 2.1 ML$_{1+4}$ | SV = 2.2 ML$_{1+4}$ | SV = 4.1 ML$_{1+4}$ | SV = 2.0 ML$_{1+4}$ |
| Microstructure |  |  |  |  |
| 1,2-vinyl (%) | 17.5 | 29.0 | 7.3 | 39.0 |
| cis-1,4 (%) | 33.0 | 28.5 | 47.6 | 20.3 |
| Izod impact strength (notched) (kg · cm/cm) |  |  |  |  |
| 23° C. | 7.3 | 6.5 | 7.1 | 5.1 |
| Tensile strength (kg/cm$^2$) | 230 | 215 | 190 | 240 |
| Elongation (%) | 35 | 40 | 45 | 20 |
| Falling weight impact strength (kg · cm) |  |  |  |  |
| 23° C. | 15.9 | 13.1 | 9.0 | 8.0 |
| −40° C. | 13.6 | 11.9 | 5.7 | 5.4 |

As is clear from Table 2, Examples 2 and 3 which use the polybutadienes having 1,2-vinyl content of 15 to 35% and the relationship between the solution viscosity and the Mooney viscosity within the range of the present invention are excellent in falling weight impact strength at room temperature and the values hardly lowering even at such a low temperature as −40° C. On the other hand, Comparative Example 3 in which 1,2-vinyl content is very low is excellent in Izod impact strength but high in swelling index and inferior in falling weight impact strength particularly at the low temperature. Comparative Example 4 in which 1,2-vinyl content is as high as 39% is very low in swelling index and inferior in Izod impact strength and falling weight impact strength to Examples 2 and 3.

EXAMPLES 4–6, Comparative Examples 5–7

Polybutadienes having various values in the solution viscosity and Mooney viscosity were prepared as follows.

Using a procedure similar to that described in Example 1 for preparing Sample A, three polybutadienes (Samples H-1, H-2 and H-3) as set forth in Table 3 within the range of the present invention were obtained.

For comparison, polybutadiene outside the range of the present invention (Sample I) was prepared using a procedure similar to that described in Example 1 for preparing Sample A using a large amount of the coupling agent. Further polybutadiene commercially available (Sample J, Diene 55A manufactured by Asahi Kasei Kogyo Kabushiki Kaisha) was also used. In addition, polybutadiene outside the range of the present invention (Sample K) was also prepared using a procedure similar to that described in Example 1 for preparing Sample A. Their properties are as set forth in Table 3.

Using these 6 polybutadienes, impact-resistant polystyrenes were prepared by bulk polymerization in the same manner as described in Example 1. Strengths of the polystyrenes were evaluated in the same manner as described in Example 1 and set forth in Table 3.

EXAMPLES 7 AND 8, Comparative Examples 8–10

Samples A and E, which are within the range of the present invention, and Samples B, F and G, which are outside the range of the present invention, were used to produce impact-resistant polystyrenes by bulk-suspension polymerization as follows.

Polybutadiene (Sample A, E, B, F or G) (6 parts) was added to 94 parts of styrene and stirred at room temper- Table 3

| Example No. | Example 4 | Example 5 | Example 6 | Comparative Example 5 | Comparative Example 6 | Comparative Example 7 |
|---|---|---|---|---|---|---|
| Polybutadiene Sample No. | H-1 | H-2 | H-3 | I | J | K |
| Mooney viscosity ($ML_{1+4}$) | 35 | 51 | 73 | 41 | 51 | 92 |
| 5% Styrene solution viscosity (SV) (cps) | 56 | 135 | 170 | 40 | 172 | 235 |
| | $SV = 1.60\, ML_{1+4}$ | $SV = 2.65\, ML_{1+4}$ | $SV = 2.33\, ML_{1+4}$ | $SV = 0.98\, ML_{1+4}$ | $SV = 3.37\, ML_{1+4}$ | $SV = 2.55\, ML_{1+4}$ |
| Microstructure | | | | | | |
| 1,2-vinyl (%) | 17.3 | 18.4 | 18.2 | 17.9 | 13.0 | 18.3 |
| cis-1,4 (%) | 34.3 | 34.2 | 34.5 | 34.2 | 35.0 | 35.2 |
| Izod impact strength (notched) (kg · cm/cm) 23° C. | 7.1 | 7.2 | 7.4 | 5.4 | 6.7 | 6.9 |
| Tensile strength (kg/cm$^2$) | 235 | 227 | 210 | 235 | 205 | 180 |
| Elongation (%) | 34 | 34 | 35 | 20 | 35 | 38 |
| Falling weight impact strength (kg · cm) | | | | | | |
| 23° C. | 14.7 | 14.8 | 15.0 | 8.3 | 13.6 | 9.7 |
| −40° C. | 13.6 | 13.5 | 13.1 | 5.7 | 12.7 | 6.4 |
| Referential data 10% styrene solution viscosity (cps) | 650 | 1500 | 1900 | 450 | 5600 | 7800 |

As is clear from Table 3, Examples 4–6 are excellent in Izod impact strength and falling weight impact strength. On the other hand, Comparative Example 5 in which SV is 0.98 $ML_{1+4}$ is not good in Izod impact strength and falling weight impact strength particularly at the low temperature. Comparative Example 6 is excellent in falling weight impact strength although the 1,2-vinyl content and the relationship between SV and $ML_{1+4}$ are outside the range of the present invention. But 10% styrene solution viscosity, i.e. solution viscosity of styrene containing 10% of polybutadiene, of Comparative Example 6 as well as Comparative Example 7 is so large as shown in Table 3 that when the polybutadiene is dissolved in styrene in such a high concentration, it takes much more time to be dissolved or the resulting solution is very disadvantageous in transportation and stirring effect during the polymerization. Therefore Sample J is very disadvantageous for industrial production.

ature for 12 hours to be completely dissolved. To the resulting solution, 0.06 part of t-dodecyl mercaptan was added and the solution was bulk polymerized in the absence of a catalyst with heating at 115° C. with stirring for 6 hours. To the resulting solution containing about 35% polymerized styrene, 0.3 part of trisnonyl phenylphosphite and 0.1 part of di-t-butyl peroxide based on 100 parts of the solution were added. Then 100 parts of the resulting partially polymerized solution was suspended in 100 parts of water dissolving 0.15 part of polyvinyl alcohol, a suspension stabilizer, and 0.05 part of sodium dodecylbenzene sulfonate. The suspended mixture was heated with stirring at 120° C. for 5 hours, at 130° C. for 3 hours and finally at 150° C. for 2 hours to substantially complete the polymerization. The resulting polystyrene in suspended particles was separated from the reaction mixture by centrifugation, washed with warm water and dried with air. The polystyrenes thus obtained were molded to measure impact strengths in the same manner as described in Example 1.

The results obtained were as set forth in Table 4.

Table 4

| Example No. | Example 7 | Example 8 | Comparative Example 8 | Comparative Example 9 | Comparative Example 10 |
|---|---|---|---|---|---|
| Polybutadiene Sample No. | A | E | B | F | G |
| Izod impact strength (notched) (kg · cm/cm) 23° C. | 6.6 | 6.5 | 7.1 | 6.8 | 4.2 |
| Tensile strength (kg/cm$^2$) | 235 | 230 | 200 | 215 | 245 |
| Elongation (%) | 40 | 40 | 35 | 30 | 20 |
| Falling weight impact | | | | | |

Table 4-continued

| Example No. | Example 7 | Example 8 | Comparative Example 8 | Comparative Example 9 | Comparative Example 10 |
| --- | --- | --- | --- | --- | --- |
| strength (kg · cm) | | | | | |
| 23° C. | 17.2 | 15.8 | 6.1 | 8.5 | 9.7 |
| −40° C. | 14.6 | 13.7 | 5.1 | 6.7 | 8.1 |

As is clear from Table 4, Examples 7 and 8, which are obtained by bulk-suspension polymerization, are superior in falling weight impact strength to Comparative Examples 8–10.

EXAMPLE 9, Comparative Example 11

Impact-resistant acrylonitrile-butadiene-styrene resins, wherein styrene was partially replaced by acrylonitrile, were prepared by bulk polymerization using polybutadienes, Sample A and Sample J (for comparison), as follows.

Polybutadiene (Sample A or J) (3.5 parts), 54.5 parts of styrene, 20 parts of acrylonitrile, 20 parts of toluene, 0.5 part of mineral oil, 0.2 part of alpha-methyl styrene dimer, and 1.3 parts of 2,6-di-t-butyl-4-methylphenol were stirred at room temperature for more than 12 hours to dissolve the toughening agent completely. The resulting solution was placed in a reactor wherein the polymerization was carried out by raising the temperature from 100° C. to 130° C. in 2 hours with stirring, then raising the temperature from 130° C. to 150° C. in 3 hours with stirring and finally raising the temperature from 150° C. to 170° C. in 5 hours. Then the temperature was raised to 230° C. and the unreacted matters were removed in vacuo. The resulting polymer was crushed and pelletized using an extruder.

The terpolymers thus obtained were molded to measured strengths in the same manner as described in Example 1. The results obtained were as set forth in Table 5.

Table 5

| Example No. | Example 9 | Comparative Example 11 |
| --- | --- | --- |
| Polybutadiene Sample No. | A | J |
| Izod impact strength (notched) (kg · cm/cm) | | |
| 23° C. | 7.4 | 6.8 |
| Tensile strength (kg/cm$^2$) | 234 | 208 |
| Elongation (%) | 37 | 38 |
| Falling weight impact strength (kg · cm) | | |
| 23° C. | 17.4 | 16.1 |
| −40° C. | 10.5 | 5.4 |

As is clear from Table 5, even when styrene is partially replaced by acrylonitrile, the resulting acrylonitrile-butadiene-styrene resin using Sample A (Example 9) is superior in Izod impact strength and falling weight impact strength either at room temperature or at the low temperature to that obtained using Sample J (Comparative Example 11).

What is claimed is:

1. A high-impact polystyrene composition comprising a major amount of (1) polystyrene or (2) a copolymer of styrene and at least one monomer copolymerizable with styrene, the amount of said monomer being at most 50% by weight based on the total weight of the styrene and the monomer, and a minor amount of a diene polymer, the diene polymer having been prepared from more than 50% by weight of 1,3-butadiene and less than 50% by weight of at least one conjugated diolefin selected from the group consisting of isoprene; 1,3-pentadiene; 2,3-dimethyl-1,3-butadiene; 2-ethyl-1,3-butadiene; 2,3-diethyl-1,3-butadiene; 2-phenyl-1,3-butadiene; and 2,3-diphenyl-1,3-butadiene; by solution polymerization using an organic lithium compound as catalyst and having been grafted onto the polystyrene or styrene copolymer by free-radical polymerization and forming a two-phase structure, and the diene polymer having a (1) 1,2-vinyl content of more than 15 to 35% and cis-1,4 content of 20 to 45%, and (2) Mooney viscosity (ML$_{1+4}$) of 25 to 85, solution viscosity of styrene containing 5% by weight of the diene polymer (SV) at 25° C. being 50 to 200 cps, and 1.5 ML$_{1+4}$ ≦ SV < 3.0 ML$_{1+4}$.

2. A composition according to claim 1, wherein the weight ratio of the diene polymer to the polystyrene is from 2:98 to 20:80.

3. A composition according to claim 1, wherein the comonomer is alpha-methyl styrene, vinyltoluene, acrylonitrile or methyl methacrylate.

4. A composition according to claim 1, wherein the conjugate diolefin is isoprene or 1,3-pentadiene.

5. A composition according to claim 1, wherein the diene polymer has (1) 1,2-vinyl content of 16 to 35% and cis-1,4 content of 25 to 45%, and (2) Mooney viscosity (ML$_{1+4}$) of 30 to 70, solution viscosity of styrene containing 5% by weight of the diene polymer (SV) at 25° C. being 50 to 150 cps, and 1.5 ML$_{1+4}$ ≦ SV ≦ 2.5 ML$_{1+4}$.

6. A composition according to claim 1, wherein the diene polymer has (1) 1,2-vinyl content of 17 to 30% and cis-1,4 content of 30 to 40%, and (2) Mooney viscosity (ML$_{1+4}$) of 30 to 65, solution viscosity of styrene containing 5% by weight of the diene polymer (SV) at 25° C. being 50 to 135 cps, and 1.6 ML$_{1+4}$ ≦ SV ≦ 2.2 ML$_{1+4}$.

7. A composition according to claim 1, wherein the composition is prepared by free radical polymerization of styrene which dissolves 2 to 20 parts by weight of one or more diene polymer prepared by solution polymerization using an organic lithium compound as catalyst, said diene polymer having (1) 1,2-vinyl content of more than 15 to 35% and cis-1,4 content of 20 to 45%, and (2) Mooney viscosity (ML$_{1+4}$) of 25 to 85, solution viscosity of styrene containing 5% by weight of the diene polymer (SV) at 25° C. being 50 to 200 cps, and 1.5 ML$_{1+4}$ ≦ SV ≦ 3.0 ML$_{1+4}$, the total weight of the styrene and the polybutadiene being 100 parts by weight.

8. A process for producing high-impact polystyrene which comprises dissolving 2 to 20 parts by weight of one or more diene polymers prepared from more than 50% by weight of 1,3-butadiene and less than 50% by weight of at least one conjugated diolefin selected from the group consisting of isoprene; 1,3-pentadiene; 2,3-dimethyl-1,3-butadiene; 2-ethyl-1,3-butadiene; 2,3- diethyl-1,3-butadiene; 2-phenyl-1,3-butadiene; and 2,3-diphenyl-1,3-butadiene, by solution polymerization using an organic lithium compound as catalyst, said diene polymers having a (1) 1,2-vinyl content of more than 15 to 35% and cis-1,4 content of 20 to 45%, and (2) Mooney viscosity ($ML_{1+4}$) of 25 to 85, solution viscosity of styrene containing 5% by weight of the diene polymers (SV) at 25° C. being 50 to 200 cps, and $1.5\ ML_{1+4} \leq SV < 3.0\ ML_{1+4}$, in 80 to 98 parts by weight of (1) styrene or (2) a mixture of styrene and at most 50% by weight of at least one monomer copolymerizable with styrene, and carrying out free-radical polymerization to form a two-phase structure having the diene polymer grafted onto polystyrene.

9. A process according to claim 8, wherein the radical polymerization is bulk polymerization.

10. A process according to claim 8, wherein the radical polymerization is bulk-suspension polymerization.

11. A process according to claim 8, wherein the co-monomer is alpha-methyl styrene, vinyltoluene, acrylonitrile, or methyl methacrylate.

12. A process according to claim 8, wherein the organic lithium compound is n-butyllithium or sec-butyllithium.

13. A process according to claim 8, wherein the conjugated diolefin is isoprene or 1,3-pentadiene.

14. A process according to claim 8, wherein the diene polymer has (1) 1,2-vinyl content of 16 to 35% and cis-1,4 content of 25 to 45%, and (2) Mooney viscosity ($ML_{1+4}$) of 30 to 70, solution viscosity of styrene containing 5% by weight of the diene polymer (SV) at 25° C. being 50 to 150 cps, and $1.5\ ML_{1+4} \leq SV \leq 2.5\ ML_{1+4}$.

15. A process according to claim 8, wherein the polybutadiene has (1) 1,2-vinyl content of 17 to 30% and cis-1,4 content of 30 to 40%, and (2) Mooney viscosity ($ML_{1+4}$) of 30 to 65, solution viscosity of styrene containing 5% by weight of the polybutadiene (SV) at 25° C. being 50 to 135 cps, and $1.6\ ML_{1+4} \leq SV \leq 2.2\ ML_{1+4}$.

* * * * *